Figure 1:
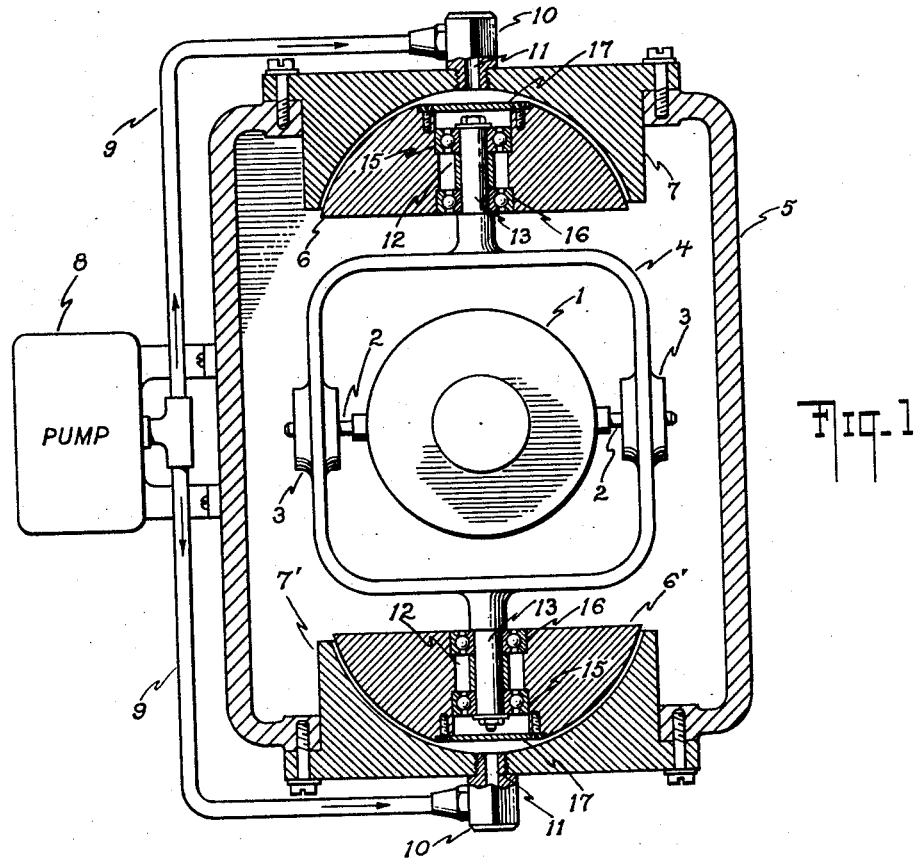

Dec. 8, 1959 R. G. BRUGGER 2,915,902
AUXILIARY BEARINGS FOR SENSITIVE INSTRUMENTS
Filed May 3, 1956

INVENTOR
RICHARD G. BRUGGER
BY
Herbert H. Thompson
his ATTORNEY.

United States Patent Office 2,915,902
Patented Dec. 8, 1959

2,915,902
AUXILIARY BEARINGS FOR SENSITIVE INSTRUMENTS

Richard G. Brugger, Hempstead, N.Y., assignor to Sperry Rand Corporation, a corporation of Delaware Application May 3, 1956, Serial No. 582,447

3 Claims. (Cl. 74—5)

This invention relates to improved bearing assembly for sensitive position maintaining instruments such as the gyro elements of directional gyroscopes and gyroscopic compasses which maintain a fixed position in azimuth. Bearings mounting an instrument for freedom about a vertical axis must have very little friction as otherwise the accuracy of the instrument is seriously affected. The type of bearing having the least friction or other coercive torques is the air bearing wherein a film of moving air flows between, separates and mounts the instrument within its fixed support so there is never any contact between the gyro element and its support.

This type bearing, however, has several drawbacks which have so far prevented it from coming into widespread use. One is that the supporting air is elastic and hence the bearing surfaces are likely to contact on sudden jolts or jars. This not only disturbs the gyroscope but may score the bearing surfaces, in which case the air bearing is ruined since it is essential that the spherical cooperating surfaces of air bearings be polished smooth and symmetrical. Another difficulty is that when the air is not being supplied to the bearing it bottoms and the surfaces may become scratched or scored. Another difficulty is that any dust or grit that enters the bearing may cause partial loss of the air film and scoring, if the bearing continues to rotate. My invention, however, is not limited to air bearings but has application to any bearing in which the cooperating bearing surfaces or areas are normally separated, but may come into contact and damage the bearing or otherwise cause error under unusual circumstances or stoppage of the supply of the supporting fluid or force.

By my invention I overcome the above mentioned drawbacks by incorporating as a part of the air bearing an auxiliary ball bearing or other antifriction bearing which serves to provide the requisite freedom whether or not the air bearing is fully operative or bottomed. By my invention, scoring of the bearing is largely prevented and the freedom of the gyroscope maintained in spite of possible bottoming, failure or contamination of the air supply. Such an auxiliary antifriction bearing, if used to provide freedom about a vertical axis, should not only be a radial or guide bearing, but also a thrust bearing so as to support the weight of the gyro or other air-borne element with minimum friction when the air support fails.

Figure 2:
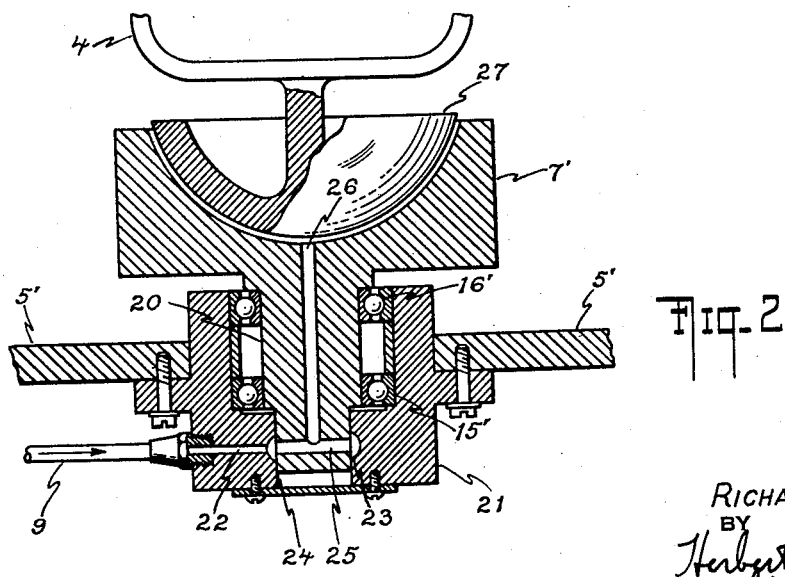

In the drawings, showing one form my invention may assume,

Fig. 1 is a vertical section of a gyroscope of the directional type showing my improved bearing assembly as applied to the vertical axis of the gyroscope; and Fig. 2 is a vertical section through a modified form of vertical guide and supporting bearing for such an instrument.

The rotor casing of the gyroscopic instrument is conventionally shown at 1, which casing is mounted for oscillation about a horizontal axis 2 by bearings 3 in a vertical ring 4. Bearings 3 are shown as ordinary antifriction bearings, although obviously they may be of the air-borne type if desired, the latter being shown in the prior patent to Leslie F. Carter, No. 2,086,896 dated July 13, 1947, for Air Supported Gyroscope. The vertical ring in turn is supported and guided for freedom about its vertical axis within the supporting casing 5 by means of my improved bearing assembly. As shown, each assembly includes two truncated spheres 6, 6' or other buttonlike member having a surface of revolution and loosely fitted within top and bottom cups 7, 7' of complementary curvature mounted in the casing 5 or mounting element of the gyroscopic instrument. The cups and spheres preferably have radii of curvature materially less than half the distance between the noted air bearing parts so that the bearings act as vertical guide bearings as well as thrust bearings. Air flow is shown as supplied to each cup from a pump 8 through pipes 9, couplings 10 and apertures 11 where it enters each cup and passes between the cup and spherical button to freely support and guide the gyro element. Aperture 11 is an opening in the part of the air bearing fixed to the mounting element 5 that extends along the vertical axis of freedom provided by the assembly for the gyro element of the instrument. One of the parts of the air bearing is fixedly connected to the mounting element.

Each button part has a central bore 12 within which the stem or trunnion 13 secured to the vertical ring 4 is mounted on antifriction bearings with respective parts indicated at 15, 16. Such bearings not only act as auxiliary guide bearings but as auxiliary thrust bearings for supporting the weight of the gyroscope, i.e., the gyro element within the lower truncated sphere. Air is preferably prevented from passing through the antifriction bearings by a covering structure such as cap 17 secured at the entrance to the bore through each button part of the air bearing. As shown, one part of the auxiliary bearing is connected to the gyro element through the ring 4. The other relatively movable part of the auxiliary bearing is mounted in the axially extending bore 12 of the button air bearing part.

During normal operation of my improved assembly, turning of the ship or other support will not turn appreciably the buttons 6, since the air bearings when operating properly have a much lower coefficient of friction than the auxiliary ball bearings. However, in case of any trouble with the air bearings or temporary contact between the two spherical surfaces from any cause, the auxiliary ball bearings will come into play to prevent any appreciable torque from being applied to the gyroscope and prevent scoring of the air bearings.

In the modified form of the invention shown in Fig. 2, my auxiliary bearings are placed between the cup and the supporting element or casing instead of between the gyro element and the spheres, but the auxiliary bearings continue to furnish full freedom about the axis of support in case of any trouble with or contact of the two parts of the air bearings. In Fig. 2 the lower cup 7' is shown as rotatably mounted within the mounting element or outer case 5' by means of guide and thrust bearings 15' and 16' by which a downward extension or post 20 from the cup 7' is journaled within the bearing member 21 secured within the lower aperture in the casing 5'. Air pressure is supplied through pipe 9 and aperture 22 in the member 21 leading to annular channel 23 within a central bore 24 in the member 21, whence air passes through cross bore 25 and through the axial passage 26 to enter the air bearing. In this case the truncated sphere need have no auxiliary bearings. It will be understood that a similar auxiliary bearing may be used at the top of casing 5', if desired. It will also be obvious that my invention is equally applicable to air bearings in which the button is on the support and the cup on the sensitive element, as shown in Figs. 4 and 12 of the aforesaid Carter patent.

It will readily be seen that all forms of the invention accomplish the same purpose as the form shown in Fig. 1, since in case the air bearing fails full freedom is retained for either the cup or button and the auxiliary bearing continues to support the gyro element so that scoring of the air bearing is prevented and torques on the gyro element avoided.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A bearing assembly for a gyroscopic instrument having a gyro element and a mounting element supporting the gyro element with freedom about a vertical axis comprising a thrust type air bearing having two parts relatively movable about the axis, one of which is connected to one of the elements of the gyroscopic instrument and the other of which includes an axially extending bore, an auxiliary bearing having two parts relatively movable about the axis one of which is connected to the other of the elements of the gyroscopic instrument and the other of which is connected to the other of the parts of the air bearing, and a structure on the bore part of the air bearing for preventing the air supplied to the air bearing from passing through the auxiliary bearing.

2. A bearing assembly for a gyroscopic instrument having a gyro element and a mounting element supporting the gyro element with freedom about a vertical axis comprising a thrust type air bearing having two parts relatively movable about the axis one of which is connected to the mounting element of the instrument and includes an axially extending opening through which air is supplied to the air bearing, an auxiliary bearing having two parts relatively movable about the axis one of which is connected to the gyro element of the instrument and the other of which is mounted in an axially extending bore in the other of the parts of the air bearing, and a cap covering the bore in the other of the air bearing parts for preventing the passage of air supplied the air bearing from the axial open part through the auxiliary bearing.

3. A bearing assembly for a gyroscopic instrument having a gyro element and a mounting element supporting the gyro element with freedom about a vertical axis comprising a thrust type air bearing having two parts relatively movable about the axis one of which is fixedly connected to the gyro element of the instrument and the other of which includes an axially extending post with an opening therein through which air is supplied to the air bearing, and an auxiliary bearing having two parts relatively movable about the axis one of which is connected to the mounting element of the instrument and the other of which is connected to the post part of the air bearing.

References Cited in the file of this patent

UNITED STATES PATENTS

| | | |
|---|---|---|
| 2,095,313 | Carter et al. | Oct. 12, 1937 |
| 2,623,353 | Gerard | Dec. 30, 1952 |